United States Patent [19]

Wagner

[11] 3,854,197
[45] Dec. 17, 1974

[54] STABILIZATION OF RADIATION DETECTORS

[75] Inventor: Sanford Wagner, Knoxville, Tenn.

[73] Assignee: Ortec, Incorporated, Oak Ridge, Tenn.

[22] Filed: Aug. 9, 1972

[21] Appl. No.: 279,176

[52] U.S. Cl. .............................................. 29/585
[51] Int. Cl. ........................................... B01j 17/00
[58] Field of Search ..................... 29/584, 585, 586

[56] References Cited
UNITED STATES PATENTS

| | | | |
|---|---|---|---|
| 2,437,995 | 3/1948 | Blackburn | 29/585 |
| 2,746,122 | 5/1956 | Zygmunt | 29/585 |
| 3,381,367 | 5/1968 | Miller | 29/585 |
| 3,736,656 | 6/1973 | Aupoix | 29/599 |

OTHER PUBLICATIONS

"IEEE Transactions on Nuclear Science," NS 12 No. 1, by Tavendale, 1964, p. 255.
"IEEE Transactions on Nuclear Science," NS 13 No. 3, by Tavendale, 1966, p. 317.
"IEEE Transactions on Nuclear Science," NS 13 No. 1, by Malm & Fowler, 1967, p. 62.
"Nuclear Instr. and Methods," 79, by Cappellani, 1970, pp. 170–174.
"Nuclear Instr. and Methods," 53, by Sher et al., 1967, pp. 341–345.

Primary Examiner—W. Tupman
Attorney, Agent, or Firm—Brumbaugh, Graves, Donohue & Raymond

[57] ABSTRACT

After the usual etching and quenching, a coaxial, lithium-drifted germanium semiconductor radiation detector is dried in an ambient atmosphere of less than 40 percent relative humidity. The detector is placed in a cryostat under a substantial vacuum, cooled substantially to the temperature of dry ice, and maintained under a continuous reverse bias. The reverse bias gives rise to a reverse leakage current through the detector, which decreases as the resistance of the detector increases. When the leakage current reaches a minimum value, the detector is further cooled, still under a reverse bias, substantially to the temperature of liquid nitrogen. This process stabilizes the full-energy peak efficiency of the detector.

6 Claims, 6 Drawing Figures

PATENTED DEC 17 1974  3,854,197
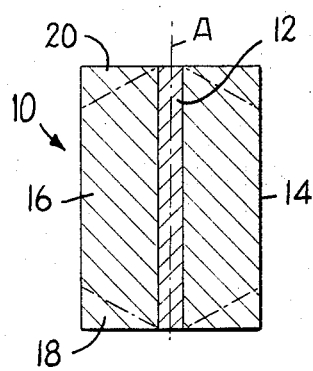
FIG. 1
(PRIOR ART)
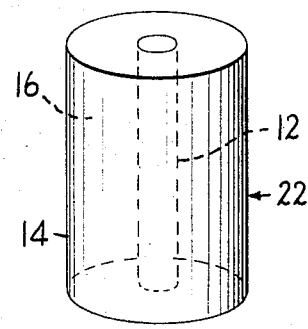
FIG. 2
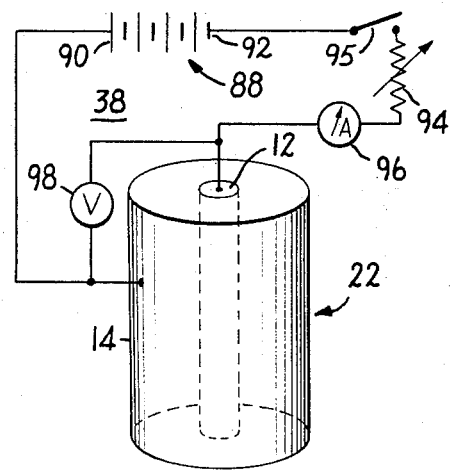
FIG. 5
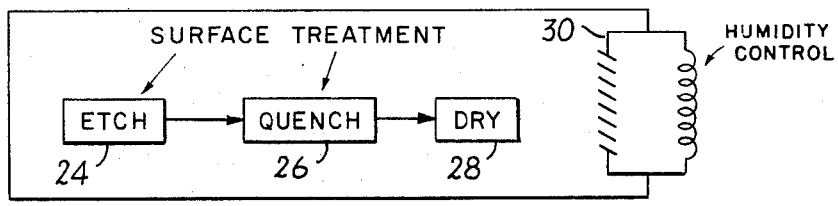
FIG. 3
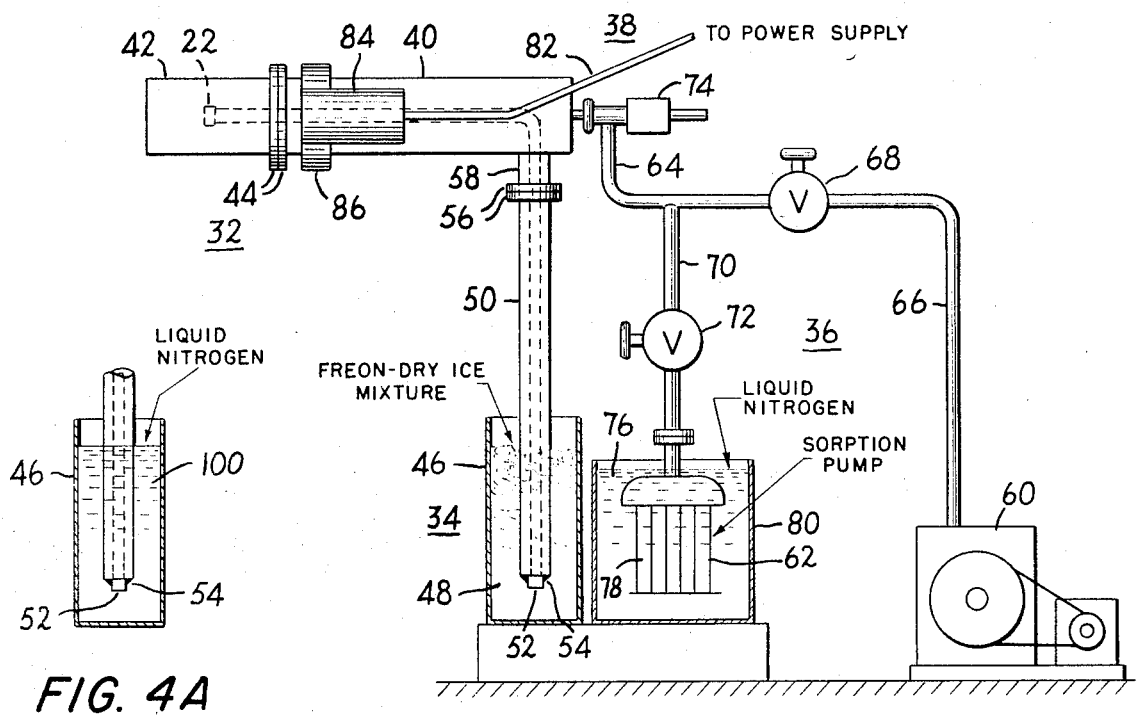
FIG. 4A
FIG. 4

STABILIZATION OF RADIATION DETECTORS

BACKGROUND OF THE INVENTION

This invention relates to radiation detectors and, more particularly, to a novel and highly-effective method of stabilizing the full-energy peak efficiency of semiconductor radiation detectors.

Various techniques are known for the production of semiconductor radiation detectors. See, for example, Tavendale, IEEE Trans. Nucl. Sci., NS-12, No. 1, p. 255 (1964); Tavendale, IEEE Trans. Nucl, Sci., NS-13, No. 3, p. 317 (1966); Malm et al., IEEE Trans. Nucl, Sci., NS-13, No. 1, p. 62 (1967); Sher et al., Nucl, Instr. and Meth. 53, p. 341 (1967); and Cappellani et al., Nucl. Instr. and Meth. 79, p. 170 (1970). However, conventional techniques produce devices whose full-energy peak efficiencies are susceptible to a significant decline with respect to time due to the development of a defective "dead" or "tired" region. In the case of coaxial detectors made by these techniques, the defective region is on the open active end or ends.

High-energy gamma rays ($\geq 1$ MeV), which lose their energy primarily by multiple Compton events to produce a full-energy peak count, now have a high probability of one or more Compton interactions in this defective region. This prevents the full energy from being released in the active part of the detector. As a result, the full energy is not measurable by the detector.

Lower-energy X-rays and gamma rays lose part or all of their energy in this defective region. As a result, the full energy is not measurable by the detector, and the incident radiation may in fact be undetected.

SUMMARY OF THE INVENTION

A primary object of the invention is to provide a semiconductor radiation detector that does not exhibit the shortcoming of prior detectors noted above and that has, in particular, a full-energy peak efficiency that is stable over an extended period of time.

The foregoing and other objects are attained in accordance with the invention by performing the standard final etch, quench and drying, or at least the drying, in an ambient atmosphere of which the relative humidity is less than 40 percent. The detector is placed in a cryostat, which is evacuated by a mechanical pump to an absolute pressure of about 10 $\mu$ and then by a molecular sieve sorption pump to as low a pressure as possible. The detector is then reverse-biased to produce a reverse leakage current in the detector and cooled substantially to the temperature of dry ice. The reverse leakage current gradually decreases and finally reaches a minimum value: in practical terms, it fails to decrease further in a 15-minute period. The detector is then cooled further, substantially to the temperature of liquid nitrogen. The reverse bias is maintained during this further cooling and is terminated when the temperature of the detector reaches equilibrium. The detector is then ready for use.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1 is a longitudinal sectional view of a conventional, coaxial, lithium-drifted germanium semiconductor radiation detector having a "dead" or "tired" defective region the development of which is prevented in accordance with the method of the present invention;

FIG. 2 is a perspective view of a coaxial, lithium-drifted germanium semiconductor radiation detector prepared by the method of the present invention so that it does not develop the defective region characteristic of the conventional detector of FIG. 1;

FIG. 3 is a diagrammatic representation of certain steps performed in accordance with the method of the invention;

FIG. 4 is a diagrammatic view of apparatus employed in performing the method of the invention;

FIG. 4A is a fragmentary view of the apparatus of FIG. 4; and

FIG. 5 is a perspective view illustrating the application to the detector of reverse bias in accordance with the invention by the apparatus of FIG. 4.

DESCRIPTION OF PREFERRED EMBODIMENTS

FIG. 1 shows a conventional, coaxial, lithium-drifted germanium semiconductor radiation detector 10 having an axis A of symmetry. A cylindrical $p$-type core 12 extends axially of the detector 10, and an $n$-region 14 produced by lithium diffusion extends around the cylindrical outer wall of the detector. A radiation-sensitive intrinsic region 16 produced by lithium drift and having the topology of a torus extends between the core 12 and the $n$-type region 14.

Ideally, the intrinsic region 16 should occupy the entire volume of the detector between the $p$-type core 12 and the $n$-type cylindrical surface 14. When the detector 10 is first manufactured, the intrinsic region 16 may in fact conform to this standard. After a relatively short period of time, however, which is often of the order of a few months but which can be substantially less, a "dead" or "tired" defective region 18, 20 is found to have developed at axially opposite ends of the detector 10. The development is progressive and presumably begins as soon or almost as soon as the detector is manufactured. By the time there is a decline of, say, 5 percent in the full-energy peak efficiency of the detector, it is unsuitable for many of its intended uses. The region 18, 20 is completely or partially insentitive to incident radiation, so that the energy of radiation passing through this region is unmeasurable to the extent that it is released in this region.

FIG. 2 shows a detector 22 made by the method of the invention. In the detector 22, the sensitive intrinsic region 16 occupies the entire volume of the detector between the $p$-type core 12 and the $n$-type cylindrical portion 14 and does not have a defective region corresponding to the region 18, 20 of the conventional detector of FIG. 1, even after extended storage.

FIG. 3 illustrates diagrammatically certain steps in the method of the invention. In accordance with usual methods of manufacturing semiconductor radiation detectors, a semiconductor wafer is etched, quenched and dried at stations 24, 26 and 28. FIG. 3 is highly schematic, in the nature of a flow diagram, and in practice the etching, quenching and drying can be performed in the same container or in different containers. In any case, during these steps, or at least during the drying step, the relative humidity of the ambient atmosphere is carefully controlled. Specifically, the relative humidity is maintained below 40 percent by a humidity control means 30 which can comprise conventional air-conditioning equipment.

Other steps of the invention are performed by apparatus illustrated in FIG. 4. This apparatus comprises a cryostat 32, cooling means 34, vacuum-producing means 36, and electrical biasing means 38.

The cryostat 32 is hollow and comprises a barrel 40, typically made of stainless steel, and an end cap 42, typically made of aluminum, joined in air-tight relation by mating flanges 44 that form a seal about an O-ring (not shown). Any suitable conventional means is employed to secure the flanges together.

The cooling means 34 comprises a container 46 within which is placed, initially, a mixture 48 of dry ice and any suitable refrigerant such as Freon. Dry ice is $CO_2$ in solid form. Freon is a trademark of E. I. du Pont de Numours & Co. for a family of refrigerants the chemical compositions of which are well known. The temperature of the mixture is that of dry ice, about 195°K. A vacuum jacket 50, typically made of stainless steel, houses a heat-conducting means such as a copper rod 52 the lower end of which protrudes from the vacuum jacket 50 and into the Freon-dry ice mixture. A weld 54 seals the bottom of the vacuum jacket 50 to the copper rod 52 at a point near the bottom of the copper rod 52. Flanges 56 seal the top end of the vacuum jacket 50 to a short extension 58 that communicates with the barrel 40 of the cryostat 32. The flanges 56 are secured together and sealed by an O-ring in the same manner as the flanges 44 or in any other suitable conventional manner.

The copper rod 52 extends, as shown in dotted outline, through the vacuum jacket 50 and extension 58 and into the barrel 40, where it executes a 90° turn. From that point, it extends horizontally through the barrel 40 to the left and into the end cap 42. For practical reasons of construction, the copper rod 52 can be in sections so that it is easily taken apart and put back together to facilitate the dismantling and setting up of the apparatus.

The detector 22 is mounted in the cryostat 32 at the end of the copper rod 52, as indicated schematically in FIG. 4. Commercial mounting cups are available for this purpose, and they ensure that the detector 22 makes good heat-exchange contact with the cooling means 34 and good electrical contact with the biasing means 38 mentioned above and described in detail below. Since the mounting cup is conventional, well known to those skilled in the art, and available from commercial sources, it is not described here in detail.

The vacuum-producing means 36 comprises a mechanical pump 60 and a molecular-sieve sorption pump 62 that can be alternately connected pneumatically to the cryostat 32. The two pumps are used in order to achieve the very high vacuum (low absolute pressure) desired. The mechanical pump 60 is connected to a line 64 by a line 66 and a valve 68; and the sorption pump 62 is connected to the same line 64 by a line 70 and a valve 72. The common line 64 is in turn connected pneumatically to the interior of the cryostat by means including a cryostat valve operator 74, which is simply a conventional safety device intended to prevent accidental opening of the cryostat valve and consequent loss of vacuum in the cryostat during the making of adjustments to the apparatus.

To establish a vacuum within the cryostat 32, the valve 72, connecting the sorption pump 62 to the cryostat 32, is initially closed, and the valve 68, connecting the mechanical pump 60 to the cryostat 32, is initially open. The mechanical pump 60 is able to produce a vacuum within the cryostat 32 of the order of 10 microns. To achieve a better vacuum, it is necessary to close the valve 68 and open the valve 72. The sorption pump 62, which comprises liquid nitrogen 76 and a molecular sieve 78 within a container 80, is thus brought into play.

The biasing means 38 comprises a power cable 82 that is connected to a conventional d.c. power supply (not shown) and an annealing box 84 secured by clamp means 86 to the outside of the barrel 40. Electrical power is brought into the cryostat 32 through the annealing box 84 and to the detector 22.

FIG. 5 shows schematically the manner in which the biasing means 38 is connected to the detector 22. A d.c. source 88, constituting the power supply not illustrated in FIG. 4, has its positive side 90 connected to the $n$-type region 14 of the semiconductor 22 and its negative terminal 92 connected to the $p$-type region 12 of the semiconductor 22, so that the semiconductor 22 is reverse-biased.

A potentiometer 94 is included in the circuit so that the bias supplied to the semiconductor 22 can be adjusted. Advantage is taken of this feature to establish within the semiconductor 22 an initial reverse leakage current of 3 milliamperes. As the resistance of the detector 22 increases during the anneal, the reverse leakage current through the detector decreases. The voltage drop across the detector increases in accordance with Ohm's Law. An ammeter 96 monitors the current through the detector, and a voltmeter 98 monitors the voltage drop across the detector.

The operation of the apparatus is as follows: a detector is etched, quenched and dried as indicated in FIG. 3, and at least the drying operation is performed in an ambient atmosphere of which the relative humidity is less than 40 percent. The detector is loaded into the cryostat as indicated in FIG. 4, and the electrical connections to the detector are made as indicated in FIG. 5, the switch 95 being initially opened. With the cryostat sealed, it is pumped down with the mechanical pump 60 to an absolute pressure of 10 microns, the valve 68 being opened and the valve 72 being closed. The valve 68 is then closed and the valve 72 is opened so that the cryostat is pumped by the molecular sorption pump 62 to as low a pressure as possible.

The Freon-dry ice mixture 48 is then placed in contact with the copper rod 52 so that the temperature of the detector 22 is gradually brought substantially to the temperature of dry ice. (Because of inevitable heat leakage, the heat flow to and from the detector actually reaches equilibrium at a temperature a bit higher than that of dry ice.) At the same time, the switch 95 is closed so that the detector 22 is reverse-biased and the potentiometer 94 is adjusted so that the reverse leakage current through the detector 22 is 3 milliamperes. This is a value that does not cause thermal runaway due to power dissipation in the detector 22.

The reverse bias is maintained until the reverse leakage current as measured by the ammeter 96 fails to decrease further in any 15-minute period. By this time, the current through the detector is about 0.1 or 0.01 milliamperes, and the voltage drop across the detector, depending on its construction, is about 1,000 volts. Typically, this annealing process requires about 3 to 6 hours. The outside range is about 2 to 8 hours.

The detector 22 is then cooled substantially to the temperature of liquid nitrogen (about 77°K)— or, because of heat leakage, to a temperature slightly warmer than that. This is accomplished by bringing liquid nitrogen into contact with the copper rod 52 as shown in FIG. 4A. The liquid nitrogen 100 can be contained in the same vessel 46 or in a separate vessel. The reverse bias is then removed, and the detector is ready for use.

Thus there is provided in accordance with the invention a novel and highly-effective method of stabilizing the full-energy peak efficiency of a semiconductor radiation detector. Many other embodiments of the invention will readily occur to those skilled in the art upon consideration of this disclosure. For example, while the humidity control and biasing are most beneficial when both are performed, they are advantageous when either is performed. Moreover, the materials, shapes, times, temperatures, currents, voltages and other parameters can all be varied from the preferred values disclosed above, as those skilled in the art will readily appreciate. Accordingly, the invention is to be construed as including all of the embodiments thereof within the scope of the appended claims.

I claim:

1. A method of stabilizing the full-energy peak efficiency of a semiconductor radiation detector comprising the steps of:
    placing the detector in a substantial vacuum;
    cooling the detector substantially to the temperature of dry ice;
    applying a reverse bias to the detector during the cooling to generate a reverse leakage current in the detector;
    maintaining the detector substantially at the temperature of dry ice and under reverse bias for a period of 2 to 8 hours until the reverse leakage current reaches a minimum value; and
    further cooling the detector substantially to the temperature of liquid nitrogen.

2. A method of stabilizing the full-energy peak efficiency of a semiconductor radiation detector comprising the steps of:
    etching and quenching the detector;
    drying the detector in an ambient atmosphere of less than 40 percent relative humidity;
    placing the detector in a substantial vacuum;
    cooling the detector substantially to the temperature of dry ice;
    applying a reverse bias to the detector during the cooling to generate a reverse leakage current in the detector;
    maintaining the detector substantially at the temperature of dry ice and under reverse bias until the reverse leakage current in the detector reaches a minimum value; and
    further cooling the detector substantially to the temperature of liquid nitrogen.

3. A method according to claim 2 comprising the step of maintaining the detector under reverse bias during the further cooling.

4. A method according to claim 2 comprising the step of adjusting the reverse leakage current through the detector to an initial value of about 3 milliamperes.

5. A method according to claim 4 comprising the step of allowing the reverse leakage current through the detector to decline to about 0.01 to 0.1 milliamperes and the potential drop across the detector to increase to about 1,000 volts.

6. A semiconductor radiation detector made by the method of claim 2.

* * * * *

UNITED STATES PATENT AND TRADEMARK OFFICE
CERTIFICATE OF CORRECTION

PATENT NO. : 3,854,197
DATED : December 17, 1974
INVENTOR(S) : Sanford Wagner

It is certified that error appears in the above-identified patent and that said Letters Patent are hereby corrected as shown below:

On the Cover Page, Col. 2, last line, "6 Claims" should read --5 Claims--;

Col. 2, line 23, after "OF" insert --THE--;

Col. 3, line 19, "Numours" should read --Nemours--;

Col. 6, lines 37--38, claim 6 should be cancelled as informal.

Signed and Sealed this twenty-ninth Day of July 1975

[SEAL]

Attest:

RUTH C. MASON
Attesting Officer

C. MARSHALL DANN
Commissioner of Patents and Trademarks